(No Model.)
C. A. FAURE.
SECONDARY BATTERY.
No. 383,562.  Patented May 29, 1888.
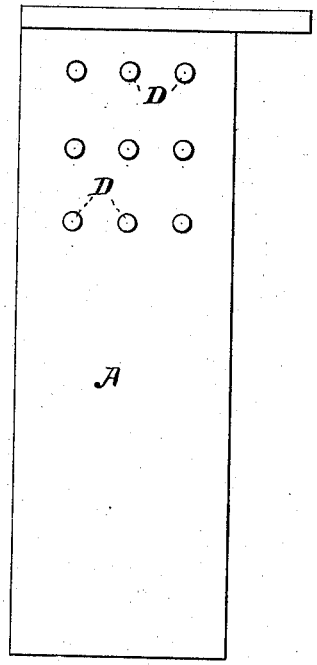
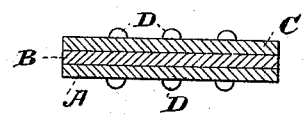

United States Patent Office.

CAMILLE ALPHONSE FAURE, OF NEW YORK, N. Y., ASSIGNOR TO THE ELECTRICAL ACCUMULATOR COMPANY, OF NEW YORK.

SECONDARY BATTERY.

SPECIFICATION forming part of Letters Patent No. 383,562, dated May 29, 1888.

Original application filed April 20, 1881, Serial No. 31,277. Divided and this application filed April 19, 1888. Serial No. 271,200. (No model.) Patented in France February 9, 1881, No. 141,057.

*To all whom it may concern:*

Be it known that I, CAMILLE ALPHONSE FAURE, a citizen of the Republic of France, and a resident of the city, county, and State of New York, have invented certain new and useful Improvements in Secondary Electric Batteries, (for which Letters Patent have been granted in France, No. 141,057, dated February 9, 1881,) of which the following is a specification.

This invention has reference to the batteries invented or discovered by Ritter and by Planté and improved by myself, which being included for a time in circuit with a suitable source of electricity, when the latter is removed and the circuit again completed, give out the electricity absorbed, so to say, and thus store electricity as in a reservoir. These batteries, commonly known as "polarization" or "secondary" batteries, consist, generally, of metal plates, serving as electrodes, immersed in a battery-fluid or electrolytic liquid. The best metal for the electrodes has been found by Mr. Planté in his laborious researches to be lead, and the best liquid for the electrolyte or battery-fluid a dilute (ten per cent.) solution of sulphuric acid in water.

The present invention consists in combining with or covering the plates, elements, or electrodes (which are not necessarily of lead or even of metal, but may be of other material adapted to the purpose) prior to immersion in the battery-fluid or electrolyte with active material, and specially with red lead (minium) in the form of a paste. Perforated or porous material which will allow free contact of the electrolyte or battery-fluid with the electrodes or plates may be used to prevent the dropping off of particles of the coating during the use of the battery, although the coating can be used without such retaining medium. The forms, proportions, and general arrangement of the plates, including the absolute or relative thickness of the lead plates and red-lead covering, can be indefinitely modified or varied within wide limits.

The accompanying drawings, which form a part of this specification, illustrate a most advantageous construction, Figure I being an elevation, and Fig. II a cross-section, of a battery-plate.

A is a leaden plate, B a layer of red lead, C a piece of felt, and D lead rivets for fastening to the lead plate the felt which holds the red lead in place. A single cell consists of two such plates immersed in the battery-fluid (or electrolytic liquid)—dilute sulphuric acid, for example—in which the active material is practically insoluble. Any number of cells can of course be formed, as well understood in the art.

I do not herein claim the method of preparing secondary batteries herein disclosed, which consists in applying to plates or supports the active material in the form of a paste prior to the immersion of the elements in the battery-fluid, as that forms the subject-matter of an application filed by me in the United States Patent Office on the 7th day of October, 1881, Serial No. 43,401, of which this is a division, made in conformity to the requirements of the Patent Office, said application of October 7, 1881, being a division of application of April 20, 1881, Serial No. 31,277, patented January 3, 1882, No. 252,202.

What I claim, and desire to secure by Letters Patent, is—

1. A secondary battery consisting of a suitable inclosing-cell, an electrolytic fluid in which the elements are practically insoluble, such as sulphuric acid and water, and two or more elements, each of which contains a plate or conductor and a previously-prepared paste of active material in contact therewith.

2. A secondary battery composed of two elements, each element consisting of a support or conductor and a previously-prepared paste of red lead, and an inclosing-cell containing an electrolytic liquid in which the elements are practically insoluble.

3. An element for a secondary battery, composed of a plate, support, or conductor and a previously-prepared paste of red lead applied thereto, substantially as described.

CAMILLE ALPHONSE FAURE.

Witnesses:
WM. B. VANSIZE,
DANIEL E. DELAVAN.